Patented Feb. 19, 1952

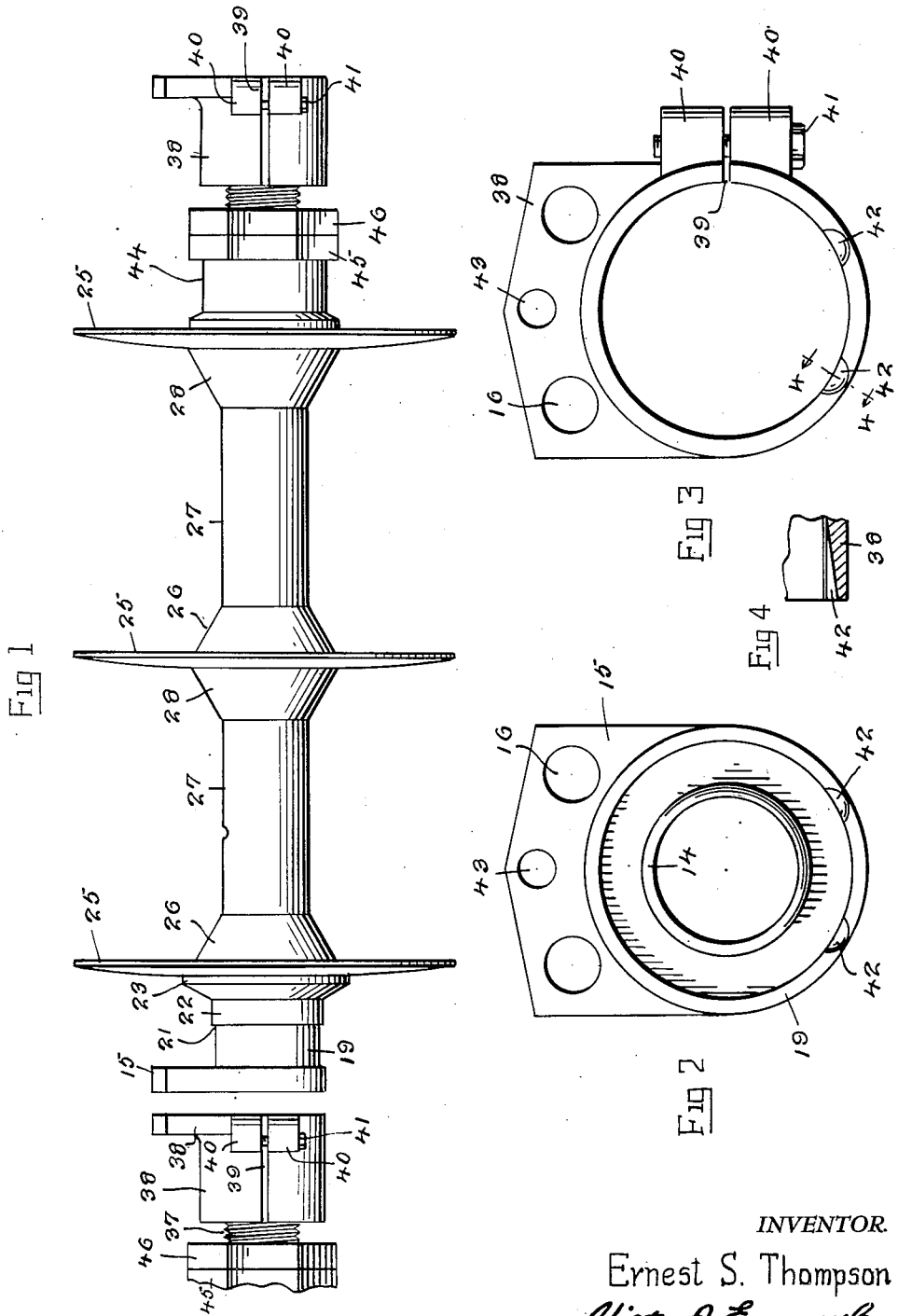

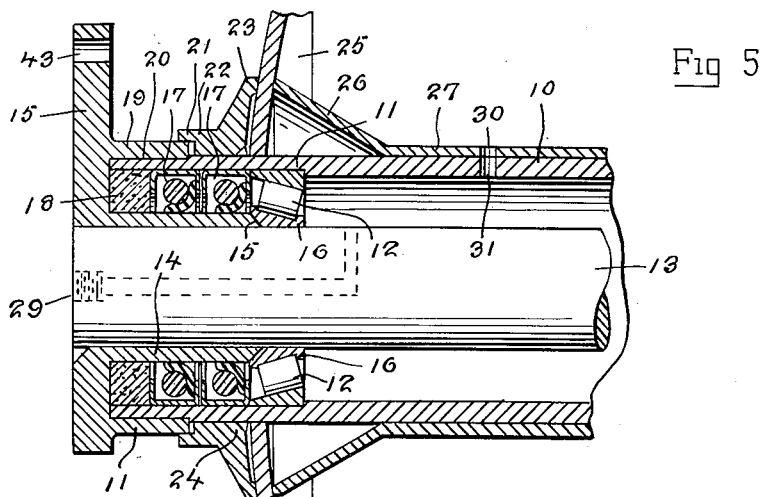

2,586,490

UNITED STATES PATENT OFFICE 2,586,490

DISK GANG MOUNTING

Ernest S. Thompson, Strathmore, Calif.

Application March 22, 1949, Serial No. 82,766

3 Claims. (Cl. 97—220)

This invention relates to a multiple sealed taper roller bearinged tubular mounting for disc blades on disc harrows, one-way disc plows or other similar assemblies where the mounting tube must revolve around a stationary shaft or axle.

In the embodiment of the invention to be later shown and described, the mounting is used for the disc blades on a disc harrow and the primary object of the invention is to seal out the outside dust and dirt and the lubricant in the tube is sealed in.

The assemblies above mentioned may be used singularly or any number may be used as required in a straight line where there are brackets provided to which the assemblies may be fixed.

With the above and other objects and advantages in view, the invention consists of the novel details of construction, arrangement and combination of parts more fully hereinafter described, claimed and illustrated in the accompanying drawings in which:

Figure 1 is an elevational view of an embodiment of the invention;

Figure 2 is an end elevational view of the end bracket;

Figure 3 is an end elevational view of the bracket;

Figure 4 is a sectional view on the line 4—4 of Figure 3;

Figure 5 is a vertical sectional view;

Figure 6 is a vertical sectional view.

Referring more in detail to the drawings, the reference numeral 10 designates the tubular mounting member which is provided at each end internally thereof with seats 11 for receiving the tapered roller bearings 12 whereby the member 10 is mounted on the stationary shaft or axle 13. The roller bearings 12 are opposed to each other in their relation to each other to prevent end play.

At one end of the shaft 13 there is secured by welding or the like, the circular sleeve hub or flange 14 of the end bracket 15 which is apertured at 16 to receive bolts for the mounting thereof, and the hub 14 is curved at 15 to engage the bearings 12 to receive the lateral and radial thrusts from the hub 16 of the bearings.

Mounted on the hub 14 and engaging the bearing 12 and the inner wall of the member 10 are the seals 17 which revolve about the hub 14 and form two independent seals. Intermediate the outermost seal 17 and the bracket 15 is a suitable packing 18 of felt braided hemp or other suitable material and this packing is compressed between the seal and bracket.

The bracket 15 is provided with an outer sleeve 19 which is concentric with the hub 14 which extends forwardly along the member 10 and is positioned in the seat 20 at the outer end thereof. This sleeve prevents the coarser materials from entering the member 10.

Mounted on the member 10 so that the annular flange 21 thereof overlaps sleeve 19 is the sleeve 22 which is provided with an annular heel flange 23, and the sleeve is counter-sunk at 24 so that when the sleeve is secured to the member 10 by welding or the like in the countersink 24, the welding will not interfere with the disc blade 25 mounted on member 10 in engagement with the heel flange 23. The overlap of flange 21 prevents wire or string from entering between the sleeve 22 and sleeve 19 which sometimes occurs in working some types of crops.

Mounted on member 10 so that the conical flange 26 thereof engages the opposite side of the disc blade 25 is the spacer spool 27, having a conical flange 28 at the opposite end to engage the next disc blade 25 in the assembly, and these elements are repeated for the number of discs that are to be used in the assembly.

The shaft 13 is provided with a lubricating passage 29 by which lubricant is fed into the member 10, and spools 27 have apertures 30 in alinement with apertures 31 in the member 10 for adding further lubricant to the member 10. The passageway and apertures 30 can be closed by a suitable fitting to prevent the escape of the lubricant after it has been fed into the member 10.

The opposite or toe end 32 of the shaft 13 is threaded at 33 to receive the complementary internally threaded sleeve flange 34 of the adjusting nut 35, which is provided with spanner wrench openings 36 for rotating the nut for the adjustment of the bearings.

The opposite end of the member 10, as stated, is provided with a seat 11 for the bearings 12, and the end of sleeve 34 engages the hub 16 of the bearings as does the sleeve 15 at the opposite end, and seals 17 and packing 18 are mounted on the sleeve 34 as previously described.

The nut 35 is of the same diameter as the member 10, at the root of the threaded portion 37 on the outer surface thereof, and this member abuts the nut at the end thereof, and at the end of the threaded portion, it abuts the bracket 38, which is provided with openings 16 to receive bolts for the mounting thereof.

The bracket 38 is split at 39 and provided with threaded apertured ears 40 on opposite sides of the split in alinement with each other to receive the locking screw 41 whereby the bracket 38 will lock the nut 35 in place when the screw 41 is tightened.

Both bracket 15 and bracket 38 are provided with sand release grooves 42 which are provided on either side of bottom center of the sleeves to form sand releases without exposing the outer ends of the member 10 to the dirt, mud or sand encountered in the operation of the assemblies.

The bracket will wear entirely through before wearing into a sand release groove 42.

As these brackets are used on both front and rear gangs which travel in opposite directions to each other, the brackets are grooved in accordance with which gang they are to be used.

In multiple mounting, the brackets may be positioned in opposite relation to each other, as shown in Figure 1. When this occurs, the openings 43 in each bracket will be in alinement with each other, so that when one assembly is to be removed, a cap screw is placed in these openings to retain the assemblies in alinement when the main bolts in openings 16 are removed.

When the last disc 25 has been positioned on member 10, a stub sleeve 44 is placed on member 10 so that the annular heel flange 45 thereof engages the opposite side of the disc 25, and nuts 45 and 46, when mounted on the portion 37 of member 10 and tightened, will retain all of the elements of the assembly as a unit.

In assembling the unit to the frame, the nut 35 is properly adjusted to the bearings, and the bracket 38 is then placed over the nut 35 and member 10. The unit is then bolted to the frame which automatically adjusts nut 35, and bracket 38, for any lengthwise variation thereof. If screw 41 is tightened, the nut 35 is fixed to prevent turning thereof.

The conical shaped or flared ends of the spools 27 makes a much stronger and cheaper spool than the customary cast spools, and can be made of any desired length according to the number of discs to be used.

It is to be noted that by this construction, the discs may be removed and replaced during repairs or replacement without disturbing the bearing adjustments or losing any lubricant, since when the assembly is removed from the frame, the screw 41 is loosened to permit bracket 38 to be slipped off, and when nuts 45 and 46 are removed, the discs and spools are free to be removed from the member 10 without disturbing nut 35 which retains the shaft 13, bearings 12, seals 17 and member 10 as a unit.

By holding the heel flange 23, which is fixed to the member 10, this member may be held rigidly while tightening or removing nuts 45 and 46.

The construction thus described is adaptable to use any desired spacing of discs through different lengths of spools 27 and various lengths of stub sleeves 44, but in some assemblies, when there is insufficient room to use a sleeve 44, the nuts 45 and 46 engage the last disc.

Many sizes of disc harrows may be assembled, with only a few different lengths of members 10, by using single members for small harrows and several combinations for larger ones.

The assemblies are easy to remove and replace discs, change length of spools, and since it contains a large amount of lubricant, it needs lubrication only once or twice a year. It also prevents end play or off center wabble of the discs.

From the above description, it is believed that the operation and construction of the invention will be apparent to those skilled in the art, and it is to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A device of the character described for mounting a gang of disc harrows comprising a fixed shaft, a bracket, a circular flange on said bracket secured to one end of said shaft, an adjusting nut, a circular flange on said nut mounted on the opposite end of said shaft, a second bracket for said shaft mounted on said nut, seals mounted on the flange on said nut and the flange on said first mentioned bracket, bearings on said fixed shaft engaging the inner end of the flange on said nut and the inner end of the flange on said first bracket, a tubular member rotatably mounted on said bearings, and dust excluding sleeves mounted on said tubular member.

2. The invention as in claim 1 wherein seats are provided in said tubular members for said bearings.

3. The invention as in claim 1 wherein each of the brackets has an annular sleeve overlying said tubular member and the dust excluding sleeves are provided with annular flanges overlapping said sleeves on the brackets.

ERNEST S. THOMPSON.

REFERENCES CITED

The following references are of record in the file of this patent:

UNITED STATES PATENTS

| Number | Name | Date |
| --- | --- | --- |
| 2,102,822 | Viau | Dec. 21, 1937 |
| 2,248,069 | Domries | July 8, 1941 |
| 2,389,993 | Mitchell | Nov. 27, 1945 |